United States Patent [19]

Jable et al.

[11] Patent Number: 4,699,399
[45] Date of Patent: Oct. 13, 1987

[54] TANDEM-AXLE WALKING BEAM SUSPENSION

[75] Inventors: Roger D. Jable, Downers Grove; James B. Taylor, Naperville, both of Ill.

[73] Assignee: The Boler Company, Itasca, Ill.

[21] Appl. No.: 886,005

[22] Filed: Jul. 16, 1986

[51] Int. Cl.⁴ .............................................. B60G 5/00
[52] U.S. Cl. .................................... 280/680; 280/676
[58] Field of Search ............... 280/677, 680, 686, 687, 280/676

[56] References Cited

U.S. PATENT DOCUMENTS

| | | | |
|---|---|---|---|
| 3,046,036 | 7/1962 | Page | 280/680 |
| 3,367,677 | 2/1968 | Preddy, Jr. | 280/680 |
| 3,397,896 | 8/1968 | Willetts | 280/677 |
| 3,817,550 | 6/1974 | Young | 280/680 |
| 3,907,324 | 9/1975 | Mastin | 280/680 |
| 3,913,937 | 10/1975 | Longworth et al. | 280/680 |
| 4,245,852 | 1/1981 | Lie et al. | 280/680 |
| 4,500,110 | 2/1985 | McWhorter | 280/677 |

*Primary Examiner*—Richard A. Bertsch
*Attorney, Agent, or Firm*—Lockwood, Alex, FitzGibbon & Cummings

[57] ABSTRACT

A tandem-axle walking beam suspension is disclosed which uses bushings of novel design in the bores at opposite ends of the walking beams. The cores of the bushings have projecting ends each of which fits between the bifurcated end of one of the pair of axle bracket arms which straddle one end of each walking beam. A removable fastener, such as a nut and bolt is used to connect each projecting bushing core end and its associated bifurcated axle bracket arm. The resulting new system of connecting the equalizer or walking beams to the axle brackets provides easier serviceability of the beam end connections during repair or replacement and by using shims in the connections provides a convenient means of suspension alignment.

5 Claims, 4 Drawing Figures

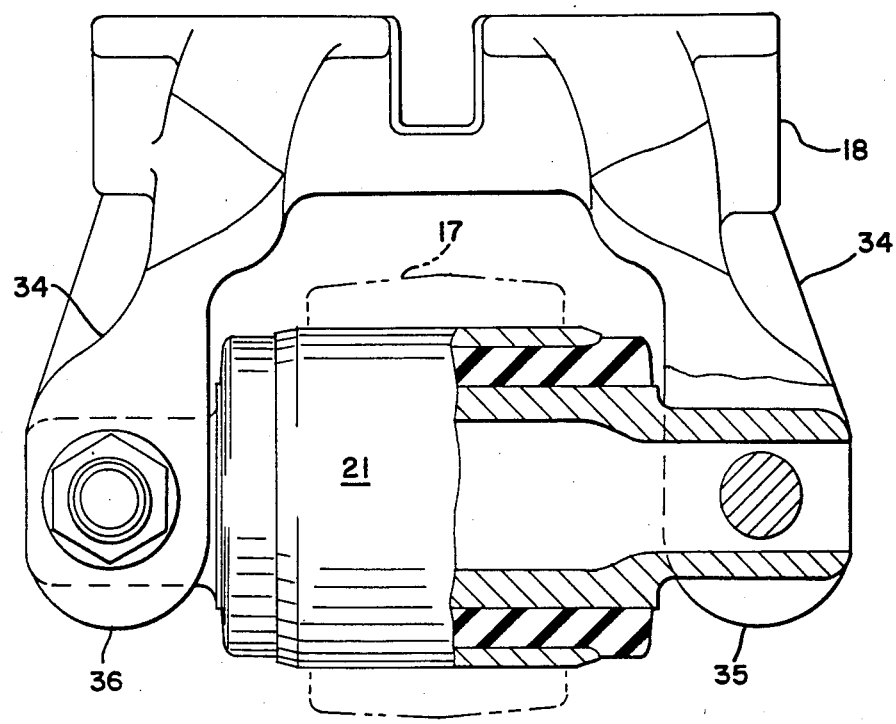
FIG_3_
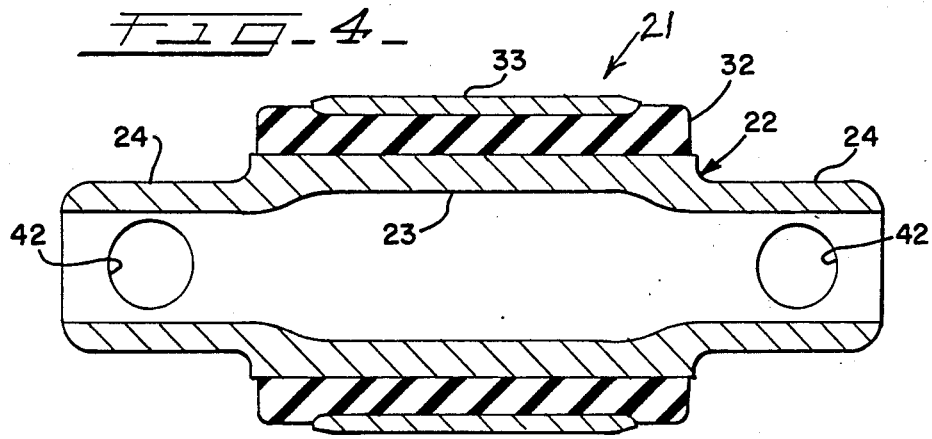
FIG_4_

TANDEM-AXLE WALKING BEAM SUSPENSION

This invention relates, generally, to improvements in tandem-axle walking beam suspensions and more particularly to improvements in the means whereby axle brackets on the opposite ends of the axle housings are connected to the bushings in the eyes at opposite ends of the equalizer beams or walking beams.

Tandem-axle walking beam suspensions are well known in the art and are widely used on heavy duty trucks and truck tractors. Suspensions of the type to which the present invention relates are disclosed for example in Small U.S. Pat. No. 2,914,349 dated Nov. 24, 1959 and McWhorter U.S. Pat. No. 4,500,110 dated Feb. 19, 1985.

There are two recognized problems associated with the connections between the opposite ends of the equalizer or walking beams and the axle brackets in tandem-axle walking beams suspensions of the type to which the invention relates. One problem is so-called "freezing" resulting from rusting at the intimate contact between a beam end connection and the equalizer beam end bushing. This "freezing" problem is specifically mentioned in Small U.S. Pat. No. 2,914,349 which sought to alleviate the problem. A second problem, or perhaps more accurately stated, a requirement, is the need to provide suspension alignment so that parallelism of the axles and perpendicularity of the axles to the fore-and-aft center line of the vehicle can be accommodated.

The object of the present invention, generally stated, is the provision of improvements in the connection between the equalizer beams or walking beams and axle brackets in a tandem-axle walking beam suspension so as to facilitate the servicing and repair or replacement of the connections and adjustment for suspension alignment.

Certain more specific objects of the invention will become apparent from the following detailed description of a preferred embodiment of the invention taken in connection with the accompanying drawings wherein:

FIG. 3 is an elevational view, partly broken away, taken on line 3—3 of FIG. 2; and FIG. 4 is a longitudinal sectional view through the bushing which interconnects the axle bracket and beam end in the embodiment shown in FIGS. 1-3.

Figure 1:
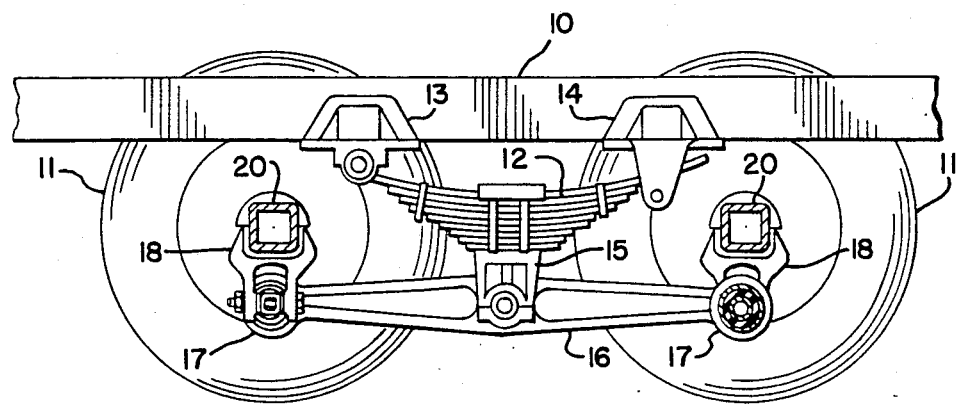
FIG. 1 is a side elevational view, considerably simplified by omission of detail, of a representative type of tandem-axle walking beam suspension embodying the invention.

Referring to FIG. 1 a tandem-axle walking beam suspension is shown interconnecting a truck chassis represented by frame member 10 to fore-and-aft dual wheels 11—11. It will be understood that in FIG. 1 only one side of the suspension is shown and that the suspension structure shown in FIG. 1 is duplicated on the opposite side of the vehicle.

The opposite ends of a leaf spring 12 are connected in known manner to front and rear brackets 13 and 14, respectively. The spring 12 is likewise mounted in known manner on the saddle 15 pivotally mounted on the middle of the walking beam or equalizing beam 16. The opposite ends of the beam 16 are provided with bushing-receiving eye formations 17—17 integrally formed on the ends of the beam. The eye formations 17 are pivotally connected to downwardly extending axle brackets 18—18 mounted on the ends of axle housings 20—20.

Figure 2:
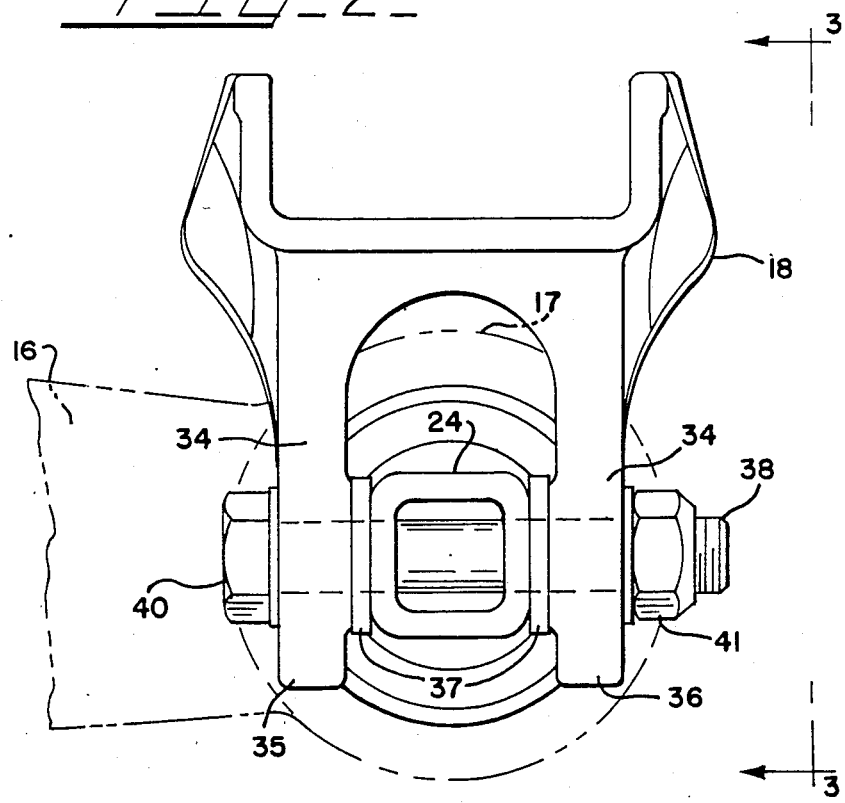
FIG. 2 is an elevational view on enlarged scale of the connection between one end of the equalizing beam in FIG. 1 (shown in broken line in FIG. 2) to the juxtaposed axle bracket.

The construction of the tandem-axle walking beam suspension shown in FIG. 1 and thus far described may be considered conventional. It should be understood that the suspension shown is only one form of the "walking beam" type suspension. Other types use different springing media such as rubber, but the walking beam and beam end connection are the common parts. The improvements provided by the present invention pertain to the novel bushings employed and the system by which the same are interconnected with the axle brackets 18. Reference may now be had to FIGS. 2-4 for a detailed description of this interconnecting means or system. In these views a composite bushing 21 is shown which comprises a core 22 having a cylindrical main body 23 and square projecting ends 24—24. The main body portion 23 is fitted with a sleeve of rubber 32 which in turn is fitted with a sleeve of bearing metal 33 on the outside thereof. This type of composite bushing construction is generally known and disclosed for example in FIG. 3 of the above-mentioned Small U.S. Pat. No. 2,914,349.

As will be seen from FIGS. 2-4 the exterior dimension or outer diameter of the bushing 21 is such as to interfit within the bore in the eye formation 17 on the end of the equalizing beam 16.

The upper portion of the axle bracket 18 corresponds to known axle bracket constructions. However, the integrally formed bracket arms 34—34 depart from known constructions. The distal ends of these arms 34 are bifurcated so as to provide pairs or fore-and-aft branches 35 and 36 respectively. The branches 35 and 36 are vertical and straddle opposite sides of the adjacent bushing core ends 24 with sufficient clearance therebetween so as to permit the insertion of shims 37—37 in the form of washers.

Each of the branches 35 and 36 is apertured so as to allow the insertion therethrough a bolt 38, the head 40 of which engages the outside of branch 35 and the other threaded end of which carries a nut 41 which engages the outside of branch 36. It will be understood that washers may be used between the bolt heads and nuts and the sides of the branches 35 and 36. Each core end 24 is provided with aligned apertures 42 through which one of the bolts 38 extends as shown in FIG. 2.

The connections between the projecting ends 24 of the bushing cores 23 and the branches 35 and 36 permit adjustment of the parallelism of the axle housings 20 and the perpendicularity thereof to the fore-and-aft center line of the vehicle with which the suspension is associated. By omitting or using shims 37 of different thicknesses in the fore-and-aft clearances provided, suitable adjustments of the suspension alignment for parallelism and perpendicularity can be readily obtained.

The connections between the opposite ends of the equalizing beam 16 and the respective axle brackets 18 can be readily serviced and repaired without encountering a problem of "freezing". Thus, the bolts 38 can be readily removed leaving the beam end and bushing 21 free to separate from the bracket arms 34—34.

What is claimed is:

1. In a tandem-axle walking beam suspension including a pair of transverse axle housings, a pair of fore and aft walking beams extending between the ends of said housings with each said beam having a bushing-receiving eye at its opposite ends, an axle bracket mounted on each of the ends of said axle housings, a bushing in each said bushing-receiving eye, and means interconnecting each of said bushings and the axle bracket juxtaposed thereto;

the improvement wherein, each said axle bracket has a pair of arms which straddle the bushing-receiving eye juxtaposed thereto with the distal end of each said arm being bifurcated into a pair fore-and-aft branches, each said bushing having a core the opposite ends project into the spaces between a juxtaposed pair of said fore-and-aft branches, and removable fastener means interconnecting each end of each said bushing core with the pair of said fore-and-aft branches juxtaposed thereto.

2. In a tandem-axle walking beam suspension including a pair of transverse axle housings, a pair of fore-and-aft walking beams extending between the ends of said housings with each said beams having a bushing-receiving eye at its opposite ends, an axle bracket mounted on each of the ends of said axle housings, a bushing in each said bushing-receiving eye, and means interconnecting each of said bushings and the axle bracket juxtaposed thereto;

the improvement wherein, each said axle bracket has a pair of arms which straddle the bushing-receiving eye juxtaposed thereto with the distal end of each said arm being bifurcated into a pair fore-and-aft branches having fore-and-aft aligned apertures therein, each said bushing having a core the opposite ends project into the spaces between a juxtaposed pair of said fore-and-aft branches, each opposite end of each said core having an aperture therein aligned with said fore-and-aft apertures in the juxtaposed pair of fore-and-aft branches thereby forming a set of three aligned apertures, and removable fastener means extending through each set of aligned apertures and interconnecting each said projecting end of a said core with a pair of fore-and-aft branches of a said bracket arm juxtaposed thereto.

3. In the tandem-axle walking beam suspension called for in claim 2, each said projecting end of a said bushing core being square.

4. In the tandem-axle walking beam called for in claim 2, each said removable fastener means being a bolt and nut combination.

5. In the tandem-axle walking beam suspension called for in claim 4, said spaces between said pair of fore-and-aft branches exceeding the widths of said ends of said bushing cores projecting into said spaces so as to provide clearances therebetween, and one or more shims disposed in one or more of said clearances.

* * * * *